Nov. 17, 1970 H. G. VORE 3,540,965
METHOD OF FORMING A JOINT BETWEEN AND ORIENTED
AND NONORIENTED PLASTIC
Filed March 31, 1967 2 Sheets-Sheet 1

INVENTOR
HERBERT G. VORE
BY Frank H Thomson
ATTORNEY

Nov. 17, 1970   H. G. VORE   3,540,965
METHOD OF FORMING A JOINT BETWEEN AND ORIENTED
AND NONORIENTED PLASTIC
Filed March 31, 1967   2 Sheets-Sheet 2
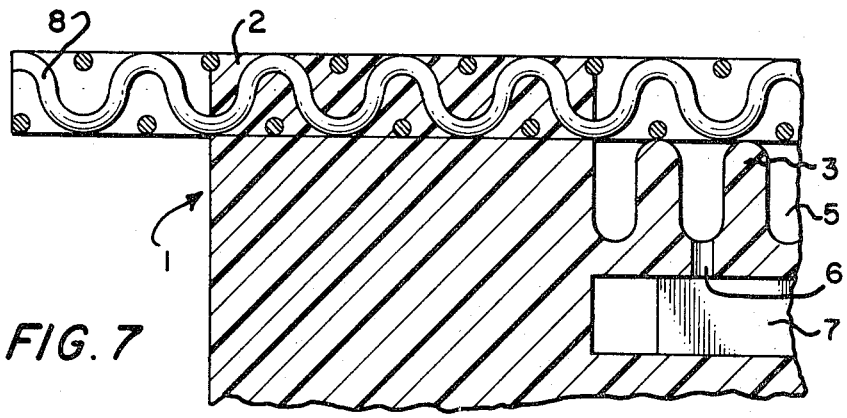
FIG. 7
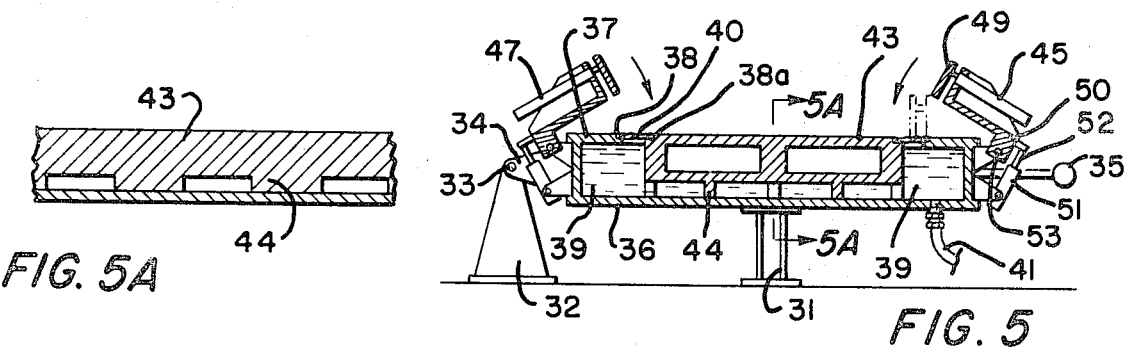
FIG. 5A
FIG. 5
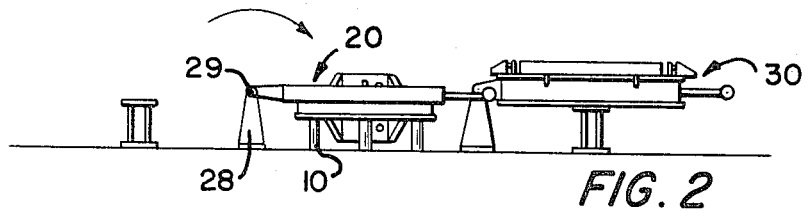
FIG. 2
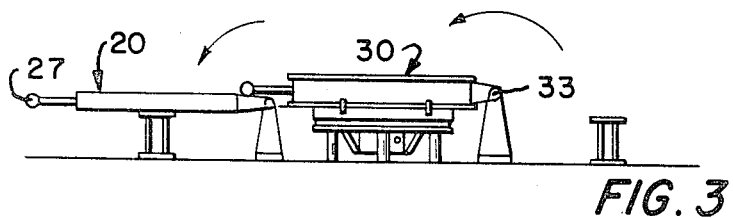
FIG. 3
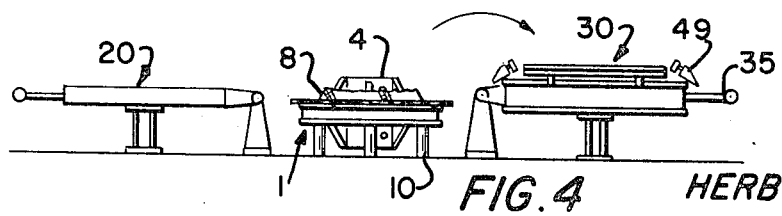
FIG. 4
INVENTOR
HERBERT G. VORE
BY *Frank H Thomson*
ATTORNEY

United States Patent Office 3,540,965
Patented Nov. 17, 1970

3,540,965
METHOD OF FORMING A JOINT BETWEEN AN ORIENTED AND NONORIENTED PLASTIC
Herbert G. Vore, Nashua, N.H., assignor to Improved Machinery, Inc., Nashua, N.H., a corporation of Delaware
Filed Mar. 31, 1967, Ser. No. 627,343
Int. Cl. C09j 5/00
U.S. Cl. 156—306                              4 Claims

ABSTRACT OF THE DISCLOSURE

A joint between a nonoriented plastic body and an oriented open weave fabric. The open weave fabric is embedded in the melted surface of the nonoriented plastic body. This constitutes the sole bonding between the two parts. A method and apparatus for forming this joint which includes a heater for heating and softening the surface of the nonoriented plastic body and a fluid pressure actuated press for forcing the oriented open weave fabric into the melted surface of the nonoriented plastic. The oriented plastic and the surface of the nonoriented plastic may be cooled while pressure is being applied.

---

This invention relates to a joint between oriented plastic and nonoriented plastic which heretofore has been accomplished only by the use of an adhesive or other bonding agent. This invention also provides a method and apparatus for securing the oriented plastic to the nonoriented plastic. This invention is particularly well adapted for use in securing an open weave fabric or screen of oriented plastic to a nonoriented plastic such as the nonoriented plastic body of a disc sector for use on a disc type filter such as that shown in U.S. Pat. No. 3,193,105.

In certain applications such as in disc filters, it has been found that the strength of nonoriented plastic is not sufficient to withstand the forces often encountered in the use of such plastics. However, nonoriented plastic such as polypropylene does have the advantage that it is easily molded; a necessary property when manufacturing items such as disc sectors. In order to provide strength qualities, it has been found that it is necessary to use a strengthening material. In disc sectors it is also necessary to include some sort of screening material on the outside of the disc sector to provide for filtering. In some applications, a metal screen or the like may be secured to the outside of the disc sector. This wire screen provides the required strength qualities. However, this metal screen has the disadvantage that it may corrode and fatigue and break allowing pulp to get through the screen into the filtrate. This often necessitates the changing of an entire disc sector since it may be difficult to replace only the wire screen. It has long been desired to employ a plastic screen such as oriented polypropylene monofilament in place of the wire screen. This screen provides the strength qualities and the filtering qualities of the metal screen yet eliminates the fatigue and corrosion factors. Since nonoriented polypropylene has a tensile strength of approximately 5,000 p.s.i. while oriented polypropylene with .010 inch diameter has a tensile strength of approximately 60,000 p.s.i., it can be readily seen that the strength qualities of the oriented plastic will provide the strength qualities necessary in most applications.

Unfortunately, if a bonding agent is used, the combination of the oriented and nonoriented plastic may become expensive and difficult to manufacture and satisfactory performance is not always achieved. Prior to my invention, there was no known method of securing oriented plastic material to nonoriented plastic material without using a bonding agent or mechanical coupling. If heat were used, the oriented plastic would become disoriented and thus lose its strength qualities. A weak joint results which is easily pulled apart.

It is therefore the principal object of my invention to provide a joint between a nonoriented plastic body and an oriented plastic material which does not require the use of a bonding agent.

It is another object of my invention to provide a method and apparatus for forming a joint between a nonoriented plastic and an oriented plastic.

It is a further object of my invention to provide a method and apparatus for forming this joint without losing the strength qualities of the oriented plastic.

In general these objects are carried out by providing apparatus for permanently securing an oriented plastic material to a nonoriented plastic material which includes means for heating the nonoriented plastic material to cause softening of the surface of the material and means for placing one of said oriented and nonoriented plastic materials on the other of said materials and for applying pressure to embed the oriented plastic material in the softened surface of the nonoriented plastic material and thereby form a joint between the materials. The method includes heating the surface of a nonoriented plastic material, placing the oriented plastic material on the heated surface of the nonoriented plastic material, and applying pressure to the nonoriented plastic material. The joint includes a nonoriented plastic body and an oriented plastic material embedded in the surface of the nonoriented plastic body, the embedding of said oriented plastic material in the nonoriented plastic body constituting the sole means for holding the oriented plastic material and the nonoriented plastic material together.

The aforementioned and other objects of this invention will become apparent from the following description and drawings wherein:

FIGS. 2, 3 and 4 are diagrammatic views showing the steps of the method of this invention;

FIG. 5 is a sectional view taken on line 5—5 of FIG. 1 showing the press of this invention;

FIG. 5A is a sectional view showing a detail of the press and taken on line 5A—5A of FIG. 5;

FIG. 7 is a detail of a portion of a disc sector having an oriented plastic screen embedded in the nonoriented plastic disc sector.

Figure 1:
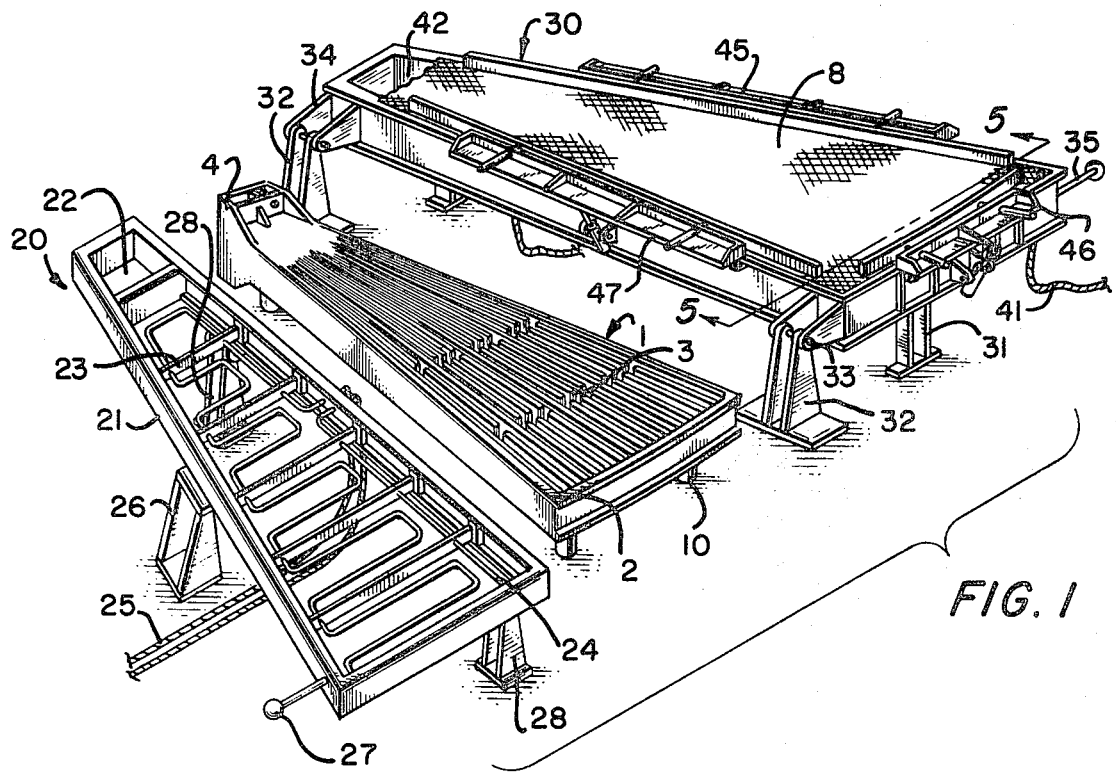
FIG. 1 is a perspective view of the apparatus of this invention with a filter disc sector in place.

Referring to the drawings and in particular to FIGS. 1 and 7, there is shown a nonoriented plastic body generally indicated at 1 which in this case is a disc sector which will be used for forming a disc filter of a well known type. The disc sector includes an edge portion 2 and a plurality of ribs 3 and troughs 5. These troughs lead to a filtrate passage generally indicated at 7. The smaller end of the disc sector includes a core end 4 which will be fixed to a filter core. An oriented plastic screen indicated at 8 is to be secured to the nonoriented plastic body 1 as indicated in FIG. 7. When the screen is fixed to the body and the disc sector is in operation, a vacuum will be applied through the filter core and to the filtrate passages 7. This vacuum will cause liquid to flow through the screen 8, troughs 5, holes 6, and into the filtrate passages 7. A mat will be formed on the screen 8. The filtering process is fully described in the aforementioned U.S. Pat. No. 3,193,105, issued to N. F. Putnam.

The nonoriented plastic body or disc sector is supported on a supporting means 10. This can be any suitable means but has been shown as three pegs. There should be some means for accurately aligning the disc sector on the supporting means.

A heating means generally indicated at 20 is set adjacent the support 10. The heating means includes a frame 21 having an open portion 22 which will receive the core end 4. The frame may include supporting ribs 23 and a heating element 24 which is supplied with electric power through power supply lines 25. The heating element 24 is substantially the same as those used on the burners of an electric stove. Although I have shown the heating element 24 in a specific configuration, if desired, other configurations which are simpler may be used. When the method and apparatus of this invention are used to secure a screen to a disc sector, the heater should be designed to heat primarily the perimeter of the disc sector. The important feature is that wherever it is desired to form the joint, the nonoriented plastic be heated. The heating means is supported on a frame 26 and 28 and is hinged about the portion 28 of the frame as at 29. A handle 27 is provided for swinging the heater element about the pivot 29.

A placing, pressure applying and cooling means or stretcher frame is generally indicated at 30. This stretcher frame or press is mounted on supports 31 and 32 and hinged at 33. The press is provided with a core end receiver 42. A channel which extends completely around the perimeter of the stretcher 30 is indicated at 36 and has a top 37 and central portion 43. The top 37 has a lip 38 and the central portion 43 has a lip 38a so that it is even with the surface of frame 30. A diaphragm 40 is placed between the lips 38 and 38a. The central portion 43 is provided with feet 44 which allow water to flow completely around channel 36. The channel 36 has secured to it a connecting link or links 34 to provide a connection between the supports 32 and the press 30. A handle 35 is provided to swing the stretcher frame about the supports 32. The channel has secured to it clamping means indicated at 45, 46 and 47. In certain applications it may be desirable to have less than three clamping means or more than three clamping means. For this particular application, however, three of these clamping means seem to work best. The clamping means include a screen holder 49 and an arm 50 which is pivoted at 53 and a hydraulic or pneumatic cylinder 51 with a piston rod 52. As pressure in cylinder 51 is increased, the piston rod 52 moves upward causing the arm 50 to pivot about point 53 and move the clamping means downward. If pressure is reduced the reverse happens and the clamping means moves away from the screen. If desired, the clamping means may include some means (not shown) such as fluid actuated pistons for stretching the screen 8 to remove wrinkles before sealing the screen to the disc sector.

OPERATION

When an oriented plastic screen is to be fixed to the disc sector 1, the disc sector is properly positioned on the supporting means 10. An oriented plastic screen 8 cut to the desired shape is placed over the diaphragm 40 and is properly aligned. The clamping means 45, 46 and 47 are then lowered and the screen holders 49 firmly hold the screen 8 in its proper position. The channel 36 is filled with a liquid 39 which is preferably cool or cold water supplied through the liquid supply and pressure line 41.

The heater means 20 is then raised to a temperature sufficient to cause surface melting in the nonoriented plastic disc 1. With a different type of plastic the temperature will vary. The important thing is that coordination between the disorientation temperature of the oriented plastic and the melting temperature of the nonoriented plastic be achieved. When the heater means has reached the particular temperature, in the case of nonoriented polypropylene, the preferable temperature is 1,200° F. to 1,500° F., the operator will grasp handle 27 and swing the heater 20 around to almost contact the disc 1. The intense heat is used so that the heater need not contact the disc sector and a short heating cycle can be used. Heat is supplied for a period of time sufficient to soften or melt only the surface of the nonoriented platsic body. The period of time should be only long enough to melt the surface and not the remainder of the nonoriented plastic. The amount of time is a function of the distance between the heater and the disc sector. Too much heating will cause deformation of the disc sector thus making it unusable. Although the operation is described using infrared heat with the heater 20 not contacting the disc sector, contact may be desirable for certain applications.

When the sealing surface of the disc sector is properly heated, the operator will swing the heater away from the surface of the sector. The operator will then grasp the handle 35 of the press 30 and swing the press and a screen 8 through an arc (FIG. 3) to move the room temperature screen onto the hot disc sector. Some pressure may be applied by the operator applying a force but preferably the majority of the pressure comes with the press locked in place from filling the channel 36 with cold water and applying pressure through the supply line 41. The pressure of the liquid 39 in channel 36 expands the diaphragm 40 and forces the oriented plastic screen into the nonoriented plastic. The cold or room temperature oriented plastic screen contacting the melted nonoriented body causes the nonoriented body to be chilled and form around the screen 8, as is clearly shown in FIG. 7. The pressure applied through the water in the channel 36 forces the screean 8 into the melted surface of the nonoriented plastic disc, and at the same time, causes additional cooling. This cooling prevents the oriented plastic screen from becoming disoriented. The stretcher frame is then swung backward, as as clearly shown in FIG. 4. The screen is now premanently secured to the nonoriented plastic disc sector.

Although I have shown as my preferred embodiment a cold water press as the means for applying pressure to secure the oriented screen path in the melted surface of the oriented plastic body 1, there are certain instances where this is not essential. With some combinations of oriented plastic and nonoriented plastic, if the plastic screen is at room temperature or chilled to some extent, then the cold water diaphragm is not necessary and room temperature water may be used. In all cases it is not essential that the joint be cooled after pressure is applied. In some instances the room temperature screen will cool the joint enough to prevent disorientation of the screen. Although I have shown an electric heating means which is hinged, this may be replaced by a simple device such as a branding iron like device where the heater is placed in an oven to reach the desired temperature and then applied to the nonoriented plastic disc. A thermostatically controlled shielded heater may also be used to heat the nonoriented plastic. A cold metal roller can then be used to apply the oriented plastic screen to the melted plastic. This is a slow operation but may be used for special applications. It has been found that the particular apparatus shown insures proper alignment of the heater and the disc.

Figure 6:
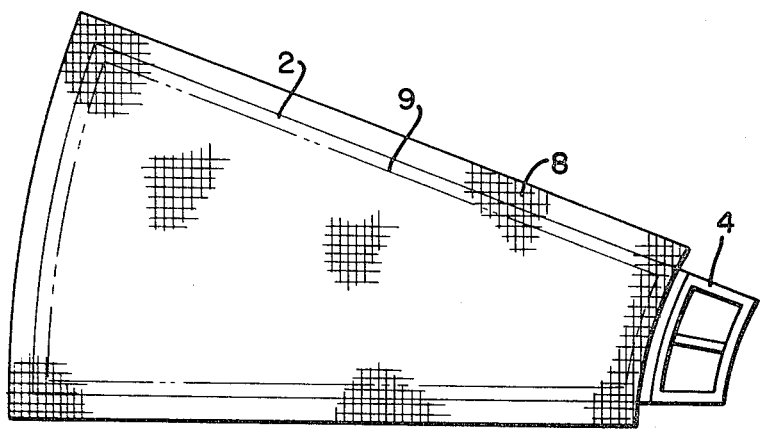
FIG. 6 is a plan view of a disc sector having a plastic screen fixed thereto.

When using the method and apparatus of this invention on a disc sector of a filter, the seal is preferably around only the perimeter of the disc sector (FIG. 6). The center line of the seal is shown at 9 in FIG. 6. By having the seal merely around the perimeter of the disc, proper filtering is insured. To insure that this is carried out, merely the perimeter of the disc sector is heated and pressure is applied only to the perimeter of the disc sector. As is apparent from FIG. 7, the oriented screen is embedded in the surface of the nonoriented plastic body. Actually, the screen is filled by the nonoriented plastic material. The screen forms a smooth line all the way across the plastic sector and does not fill the troughs 5 to any extent. The ribs 3 help to support the screen and prevent improper flexing which could result in damage.

In some applications, it may be desirable to apply pressure to the entire plastic screen when it is being forced into the melted nonoriented plastic. This can be carried out by replacing the channel 36 with a completely hollow body filled with liquid. The channel configuration provides the advantage that it allows higher pressures resulting in faster cooling of the seal.

If desired, a double machine may be constructed. Such a construction would be substantially the same as that shown in FIG. 1 except that the neutral position of the heater would be vertical instead of horizontal. A second stretcher frame and disc support would be on the other side of the heater. Such a construction allows the use of the same heater for both sides of the disc sector. The heater can be swung either clockwise or counterclockwise depending on which side of the disc sector is to be heated.

From the foregoing it is readily apparent that the objects of this invention have been carried out. A seal which is strong and durable has been provided between the nonoriented plastic body and a oriented plastic structure without the necessity of using an additional bonding agent. A simple and inexpensive method and apparatus have been provided for forming this seal.

Although I have illustrated and described my invention in connection with a disc sector for a disc filter, it is intended that this invention may be used wherever it is desired to join an oriented plastic material to a nonoriented plastic body.

It is intended that this description be merely that of a preferred embodiment and that the invention be limited only by that which is within the scope of the appended claims.

I claim:
1. The method of forming a joint between an oriented plastic material and a nonoriented plastic material comprising the steps of:
    heating the surface of the nonoriented plastic material;
    placing the oriented plastic material on the heated surface of the nonoriented plastic material;
    applying pressure to the oriented plastic material; and
    cooling said oriented plastic material and nonoriented plastic material while pressure is being applied.
2. The method of claim 1 wherein the surface of said nonoriented plastic material is heated to a temperature sufficiently hot to cause softening of said surface.
3. The method of claim 2 wherein sufficient pressure is applied to said nonoriented plastic material to embed said oriented plastic material in the softened surface of said nonoriented plastic material.
4. The method of claim 3 wherein said oriented and nonoriented plastic material are cooled to a temperature below the melting temperature of said nonoriented plastic material.

References Cited
UNITED STATES PATENTS

| | | | |
|---|---|---|---|
| 2,418,904 | 4/1947 | Rugeley et al. | 156—306 |
| 2,690,769 | 10/1954 | Brown | 156—306 |
| 2,698,273 | 12/1954 | Miner et al. | 156—306 |
| 2,766,809 | 10/1956 | Parham | 156—306 |
| 3,030,255 | 4/1962 | Winston | 156—306 |
| 3,360,412 | 12/1967 | James | 156—306 |
| 3,364,091 | 1/1968 | Conti | 156—306 |
| 3,380,868 | 4/1968 | Moser | 156—306 |
| 3,397,101 | 8/1968 | Rausing | 156—306 |

REUBEN EPSTEIN, Primary Examiner

U.S. Cl. X.R.
161—89; 156—499